United States Patent
Hoysall (10) Patent No.: US 12,467,672 B2
(45) Date of Patent: Nov. 11, 2025

(54) REFRIGERANT CHARGE MANAGEMENT DEVICE FOR HEAT PUMP SYSTEMS

(71) Applicant: Carrier Corporation, Palm Beach Gardens, FL (US)

(72) Inventor: Dhruv Chanakya Hoysall, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 428 days.

(21) Appl. No.: 18/047,907

(22) Filed: Oct. 19, 2022

(65) Prior Publication Data

US 2023/0123900 A1 Apr. 20, 2023

Related U.S. Application Data

(60) Provisional application No. 63/262,763, filed on Oct. 20, 2021.

(51) Int. Cl.
*F25B 49/02* (2006.01)
*F25B 13/00* (2006.01)

(52) U.S. Cl.
CPC .............. *F25B 49/02* (2013.01); *F25B 13/00* (2013.01); *F25B 2500/23* (2013.01)

(58) Field of Classification Search
CPC ....... F25B 49/02; F25B 13/00; F25B 2500/23
See application file for complete search history.

(56) References Cited

U.S. PATENT DOCUMENTS

| 4,546,616 A | 10/1985 | Drucker |
| 5,140,827 A | 8/1992 | Reedy |
| 7,010,927 B2 | 3/2006 | Lifson et al. |
| 2005/0044865 A1 | 3/2005 | Manole |
| 2008/0127667 A1 | 6/2008 | Buckley et al. |
| 2014/0260376 A1* | 9/2014 | Kopko ................... F25D 3/005 62/99 |
| 2016/0320105 A1 | 11/2016 | Okazaki |

(Continued)

FOREIGN PATENT DOCUMENTS

| CN | 101528323 A | * | 9/2009 |
| EP | 3118547 A1 | | 1/2017 |

(Continued)

OTHER PUBLICATIONS

Russell et al., Fluid Storage and Dispensing System, Sep. 9, 2009, CN101528323A, Whole Document (Year: 2009).*

(Continued)

*Primary Examiner* — Larry L Furdge
(74) *Attorney, Agent, or Firm* — Souad Hakim (57) ABSTRACT

Disclosed is a refrigerant charge management device comprising a refrigerant charge vessel enclosing a volume, a movable impervious barrier separating the volume into a first volume and a second volume, a first port disposed in fluid communication with the first volume and configured for fluid connection to a heat pump system, and a second port disposed in fluid communication with the second volume and configured for fluid connection to the heat pump system, wherein the movable impervious barrier is configured to move in response to a difference in pressure between the first volume and the second volume thereby changing the size of the first volume and the second volume.

20 Claims, 5 Drawing Sheets

(56) References Cited

U.S. PATENT DOCUMENTS

2019/0277548 A1 9/2019 Hern
2020/0003467 A1 1/2020 Noor et al.

FOREIGN PATENT DOCUMENTS

| JP | H07120082 A | * | 5/1995 |
| JP | 2018096681 A | * | 6/2018 |
| KR | 101474356 B1 | | 12/2014 |
| WO | 2015128122 A1 | | 9/2015 |
| WO | 2018182303 A1 | | 10/2018 |

OTHER PUBLICATIONS

Yamaguchi, Refrigerant Filling Amount Determination System, Jun. 21, 2018, JP2018096681A, Whole Document (Year: 2018).*
Sato et al., Refrigerating Cycle Apparatus, May 12, 1995, JPH07120082A, Whole Document (Year: 1995).*

* cited by examiner

REFRIGERANT CHARGE MANAGEMENT DEVICE FOR HEAT PUMP SYSTEMS

BACKGROUND

Exemplary embodiments pertain to the art of vapor compression systems. More particularly, the present disclosure relates to configurations of heat pump systems.

Heat pumps can be susceptible to conditions where there is an imbalance in refrigerant charge between heating and cooling modes of operation. For example, the refrigerant volume required for cooling operation can exceed the volume necessary for heating operation and the difference in these volumes can accumulate as liquid refrigerant in the indoor heat exchanger during heating operation. Such accumulation can cause the heat pump system to shut down or operate at reduced capacity.

Additionally, heat pump systems can have larger outdoor heat exchangers in comparison to the indoor heat exchangers. The size difference can be attributed to various factors. For example, in high efficiency systems, large outdoor heat exchangers enable higher system efficiencies for a relatively low system cost and can be utilized by heat pump manufacturers to support higher tier offerings. In another example, in retrofit applications, where new indoor or outdoor heat exchangers are paired with an existing system a heat exchanger volume mismatch can occur. In yet another example, exacting spatial constraints can be placed on the indoor heat exchanger while the spatial constraints on the outdoor heat exchangers can be more relaxed which can contribute to volume mismatch between the heat exchangers. Such disparity in heat exchanger volume can exacerbate charge imbalance when the system operates in heating mode resulting a buildup of charge in the indoor heat exchanger. Accordingly, in at least addressing this shortcoming of heat pump systems the following refrigerant charge management device is disclosed.

BRIEF DESCRIPTION

Disclosed is a refrigerant charge management device comprising: a refrigerant charge vessel enclosing a volume, a movable impervious barrier separating the volume into a first volume and a second volume, a first port disposed in fluid communication with the first volume and configured for fluid connection to a heat pump system, and a second port disposed in fluid communication with the second volume and configured for fluid connection to the heat pump system, wherein the movable impervious barrier is configured to move in response to a difference in pressure between the first volume and the second volume thereby changing the size of the first volume and the second volume.

In addition to one or more of the above disclosed aspects or as an alternate, wherein the movable impervious barrier is configured to travel from a first position to a second position as the difference in pressure changes from +90 psi(g) to −130 psi(g).

In addition to one or more of the above disclosed aspects or as an alternate, wherein the movable impervious barrier is configured to travel from a first position to a second position as the difference in pressure changes from +180 psi(g) to −320 psi(g).

In addition to one or more of the above disclosed aspects or as an alternate, wherein the movable impervious barrier comprises a polymer material.

In addition to one or more of the above disclosed aspects or as an alternate, wherein the polymer comprises polyisoprene, nitrile butadiene rubber, acrylonitrile butadiene rubber, butyl rubber, neoprene, epichlorohydrin rubber, polytetrafluoroethylene, ethylene propylene rubber, ethylene propylene diene rubber, fluoroelastomer rubber, or a combination comprising at least one of the foregoing.

In addition to one or more of the above disclosed aspects or as an alternate, wherein the movable impervious barrier comprises a metal material.

In addition to one or more of the above disclosed aspects or as an alternate, wherein the movable impervious barrier comprises a piston, a compliant divider, or a bladder.

In addition to one or more of the above disclosed aspects or as an alternate, further comprising a third port in fluid communication with one of the first volume or second volume and configured for fluid connection to the refrigeration system.

In addition to one or more of the above disclosed aspects or as an alternate, further comprising a fourth port in fluid communication with one of the first volume or second volume and configured for fluid connection to the refrigeration system, wherein only two ports are disposed in fluid communication with each of the first volume and second volume.

In addition to one or more of the above disclosed aspects or as an alternate, further comprising a stop disposed within the volume, wherein the stop is configured to prevent the movable impervious barrier from covering at least one of the first port or second port.

In addition to one or more of the above disclosed aspects or as an alternate, wherein one of the first volume or second volume is at least partially disposed in an annular passageway that surrounds the other of the first volume or second volume.

In addition to one or more of the above disclosed aspects or as an alternate, wherein the first port and second port are positioned at the bottom of the vessel such than liquid disposed therein can drain out of the vessel under the influence of gravity.

In addition to one or more of the above disclosed aspects or as an alternate, wherein the vessel comprises an annular divider surrounding the movable impervious barrier and at least partially separating the first volume from the second volume.

Also disclosed is a heat pump system comprising: a closed refrigerant circuit fluidly connecting a compressor, an outdoor heat exchanger, an expansion device, an indoor heat exchanger, and a flow reversing valve, wherein the flow reversing valve is configured to reverse the direction of a refrigerant flow through at least a portion of the circuit when the heat pump is switched from a cooling mode to a heating mode, and a refrigerant charge management device of one or more of the above disclosed aspects wherein the first port is disposed in fluid communication with a first location of the closed refrigerant circuit disposed between the compressor and the outdoor heat exchanger, and the second port is disposed in fluid communication with a second location of the closed refrigerant circuit disposed between the expansion valve and the indoor heat exchanger.

In addition to one or more of the above disclosed aspects or as an alternate, wherein the movable impervious barrier is configured to travel from a first position to a second position as the difference in pressure changes from +90 psi(g) to −130 psi(g).

In addition to one or more of the above disclosed aspects or as an alternate, wherein the movable impervious barrier is configured to travel from a first position to a second position as the difference in pressure changes from +180 psi(g) to −320 psi(g).

In addition to one or more of the above disclosed aspects or as an alternate, wherein the outdoor heat exchanger and the expansion device are disposed fluidly between the first port and second port of the closed refrigerant circuit.

In addition to one or more of the above disclosed aspects or as an alternate, wherein the first port of the refrigerant charge management device is fluidly connected to a vapor line of the heat pump system and the second port of the refrigerant charge management device is fluidly connected to a liquid line of the heat pump system.

A method of operating a heat pump system comprising: connecting in fluid communication a first port of a refrigerant charge management device and a first location in a refrigerant circuit of the heat pump system, wherein the first location is disposed fluidly between a compressor and an outdoor heat exchanger, connecting in fluid communication a second port of the refrigerant charge management device and a second location in the refrigerant circuit of the heat pump system, wherein the second location is disposed fluidly between an expansion valve and an indoor heat exchanger, operating the heat pump system comprising creating a refrigerant flow through the refrigerant circuit, simultaneously displacing a first portion and a second portion of the refrigerant flow to the refrigerant charge management device, wherein the first portion is displaced from the first location to a first volume of the refrigerant charge management device and the second portion is displaced from the second location to a second volume of the refrigerant charge management device, and simultaneously adjusting the size of the first volume and the second volume of the refrigerant charge management device based on a difference in pressure between the first volume and second volume.

In addition to one or more of the above disclosed aspects or as an alternate, further comprising: displacing a greater portion of the refrigerant flow from the first location than from the second location during a cooling mode operation of the heat pump system, and displacing a lesser portion of the refrigerant flow from the first location than from the second location during a heating mode operation of the heat pump system.

In addition to one or more of the above disclosed aspects or as an alternate, further comprising stopping the simultaneous adjustment of the size of the first volume and second volume based on the difference in pressure between them by preventing movement of a movable impervious barrier disposed between the first volume and the second volume.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

FIGS. 1a-1h are schematic illustrations of a charge management device 10. The charge management device 10 can include a refrigerant charge vessel 20 enclosing a volume and a movable impervious barrier 30 separating the volume into a first volume 24 and a second volume 28. A first port 40 can be disposed in fluid communication with the first volume 24 and configured for fluid connection to a heat pump system 100. A second port 50 can be disposed in fluid communication with the second volume 28 and configured for fluid connection to the heat pump system 100. The movable impervious barrier 30 can be configured to move in response to a difference in pressure between the first volume 24 and the second volume 28 thereby changing the size of the first volume 24 and the second volume 28.

The vessel 20 of charge management device 10 can be any suitable shape, such as cylindrical, rectangular, spherical, and the like. The vessel can include a guide 32 to aide in guiding the movement of the movable impervious barrier 30. For example, a guide 32 can include corresponding features disposed in an interior surface of the vessel 20 and in the outer periphery of the movable impervious barrier 30. The corresponding features can interact to aid alignment of the movable impervious barrier 30 within the vessel 20 during travel. In another example, a guide 32 can include a shaft extending within the vessel 20 through the movable impervious barrier 30. A shaft seal can be used to seal the movable impervious barrier 30 to the shaft and reduce leakage between the first volume 24 and the second volume 28.

The movable impervious barrier 30 can be constructed on any suitable material. For example, suitable materials can include metals such as aluminum, copper, or alloys thereof, natural rubbers (e.g., including substantially polyisoprene), nitrile butadiene rubber, acrylonitrile butadiene rubber, butyl rubber, neoprene, epichlorohydrin rubber, or other synthetic rubber materials that do not chemically react when contacted with refrigerant (e.g., R-410A, R-134, R-32, R-454B, and the like). Other examples of suitable materials include polytetrafluoroethylene, ethylene propylene rubber, ethylene propylene diene rubber, and fluoroelastomer rubber (e.g., FKM comprising copolymers of two or more of propylene, ethylene, vinylidene fluoride, hexafluoropropylene, tetrafluoroethylene, and perfluoromethylvinylether).

Figure 1A:
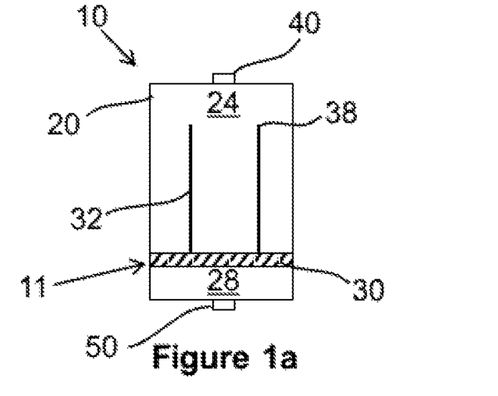
FIG. 1a is a schematic illustration of a first example of a refrigerant charge management device having a peripherally guided piston.
Figure 1B:
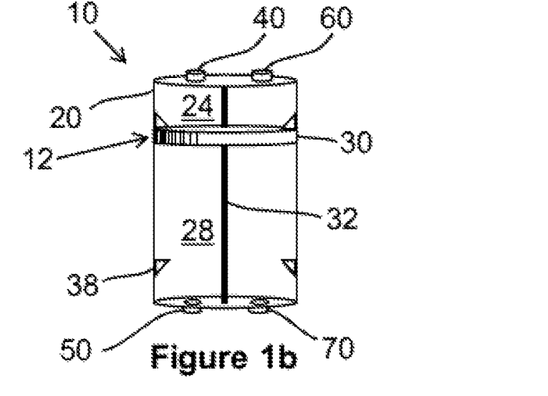
FIG. 1b is a schematic illustration of a second example of a refrigerant charge management device having a centrally guided piston.
Figures 1C, 1D:
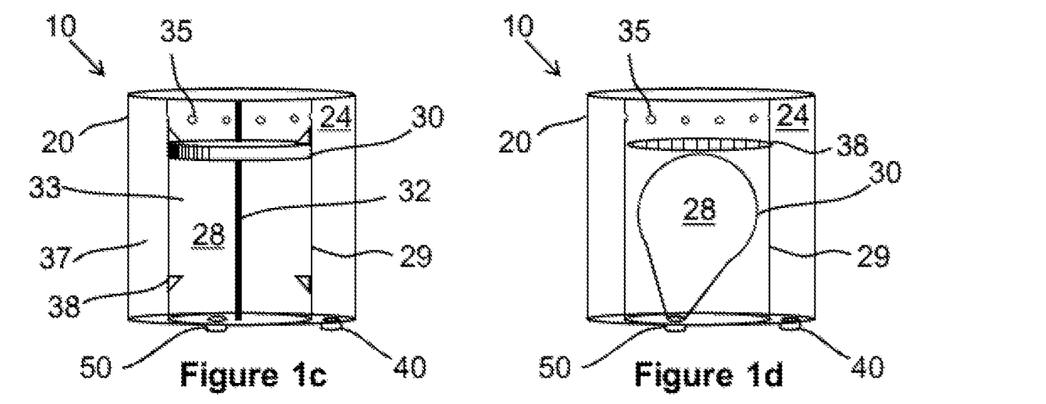
FIG. 1c is a schematic illustration of a third example of a refrigerant charge management device having an inner wall and centrally guided piston.
FIG. 1d is a schematic illustration of a fourth example of a refrigerant charge management device having an inner wall and a bladder.

The movable impervious barrier 30 can be configured as a piston within the vessel 20 as illustrated in FIGS. 1a-1c. When the first port 40 is exposed to a greater pressure than the second port 50 the movable impervious barrier 30 can travel along the pressure gradient toward a first position 11. When the first port 40 is exposed to a lesser pressure than the second port 50 the movable impervious barrier 30 can travel along the pressure gradient toward a second position 12. Optionally, to control the travel of the movable impervious barrier 30 in either direction as a function of the pressure differential across it, a spring can be disposed in the first volume 24, the second volume 28 or both volumes. For example, equally sized springs can be disposed in each of the first volume 24 and second volume 28. Each spring can be in disposed in operative engagement with the movable impervious barrier 30 and configured to oppose the other spring's force and/or movement of the movable impervious barrier 30. Through selection of such springs the relationship between the travel distance of the movable impervious barrier 30 and pressure difference across the movable impervious barrier 30 can be adjusted (e.g., for an expected pressure gradient during operation of the heat pump system 100).

Figures 1E, 1F:
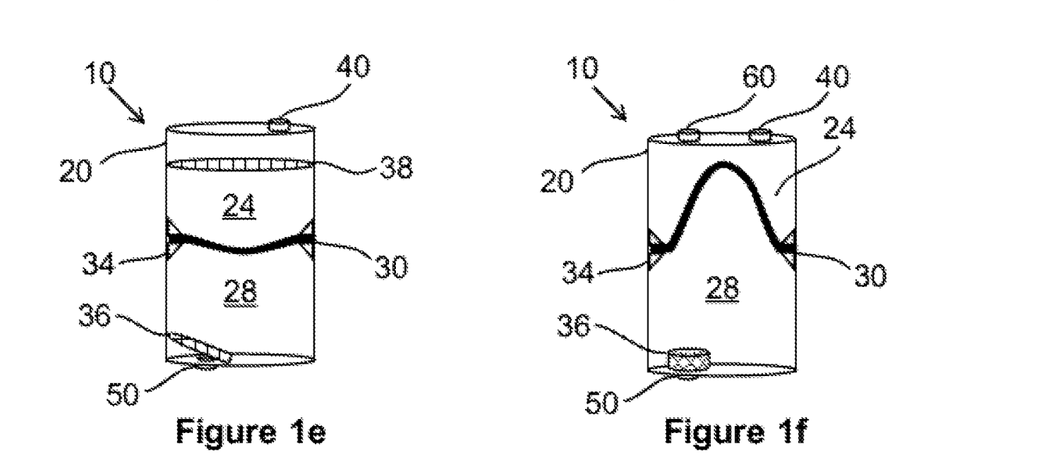
FIG. 1e is a schematic illustration of a fifth example of a refrigerant charge management device having a compliant divider under a low differential pressure condition.
FIG. 1f is a schematic illustration of a refrigerant charge management device having a compliant divider under a high differential pressure condition.
Figure 4:
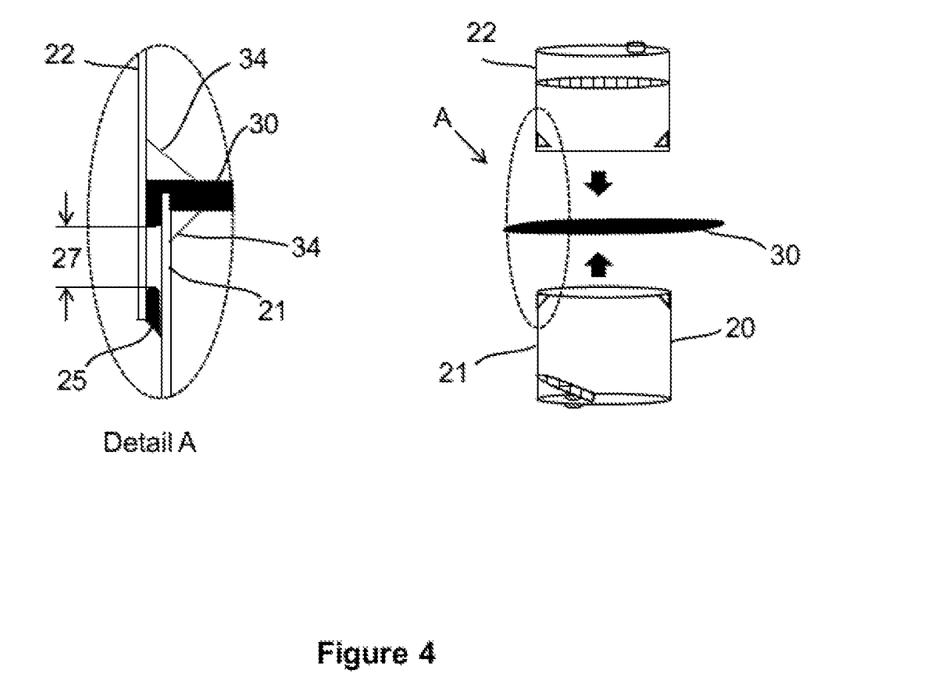
FIG. 4 is a schematic illustration of a construction of a refrigerant charge management device.

The movable impervious barrier 30 can be configured as a compliant divider within the vessel 20 as illustrated in FIGS. 1e-1f. The movable impervious barrier 30 can be attached to the interior walls of the vessel 20 with one or more fixtures 34. The fixtures 34 can be configured to engage the movable impervious barrier 30 along its perimeter and fixedly attach it to the vessel and form a seal between the first volume 24 and the second volume 28. The fixture 34 can include any suitable fixation method. For example, the fixture 34 can include opposing surfaces extending inward from the interior wall of the vessel 20 and configured to seal and grip the perimeter of the movable impervious barrier 30 (e.g., having angled teeth the allow the perimeter of the movable impervious barrier 30 to be inserted but preventing its withdraw). In another example, the vessel 20 can be formed in two pieces and the movable impervious barrier 30 can be disposed between the pieces as they are brought together and attached during assembly. In such configuration additional modifications of the vessel 20 can be used to ensure structural integrity under expected operating conditions (e.g., strapping, external clamping). For example, as shown in FIG. 4, one of the first piece 21 or second piece 22 of vessel 20 can be sized to fit within the perimeter of the other piece such that the movable impervious barrier 30 can be squeezed between the pieces upon assembly. The assembly can be sealed with a lap joint weld 25 along the periphery of the vessel 20. The lap joint weld 25 can be made a distance 27 from the movable impervious barrier 30 to reduce the likelihood of heat damage to the barrier during welding.

The movable impervious barrier 30 can be configured to deform according to the pressure differential that exists between the first volume 24 and the second volume 28. For example, as shown in FIG. 1e, the movable impervious barrier 30 can deform slightly, correspondingly slightly reducing the size of the second volume 28, when the first volume 24 is exposed to a slightly higher pressure than the second volume 28. Under more significant pressure differential conditions, e.g., where the first volume 24 is exposed to a substantially lower pressure than the second volume 28, the movable impervious barrier 30 can deform to a greater extent as shown in FIG. 1f.

The movable impervious barrier 30 can act like a spring as it reacts to the pressure differential between the first volume 24 and the second volume 28. As such, the pressure force applied to the movable impervious barrier 30 (F) can be proportional to the travel of the movable impervious barrier 30 ($\Delta x$) multiplied by its spring constant (k) as expressed in the equation:

$$F \propto k \cdot \Delta x$$

The spring constant k can further be a function of Young's modulus (Y) which is a property of the materials used, the cross-sectional area (A) and its length (L) of the movable impervious barrier 30 as shown in the equation:

$$k \propto Y \cdot \frac{A}{L}$$

Accordingly, the extent of deformation of movable impervious barrier 30 can be controlled through selection of material used in its construction, the method of construction, its thickness (e.g., in the dimension of a pressure gradient acting across the barrier when in operation), its cross sectional shape, or a combination including at least one of the foregoing. For example, a movable impervious barrier 30 having a non-uniform cross-sectional shape can be subject to localized excessive stretching along the thinner portions which could result is localized failure of the barrier, providing a substantially uniformly thick movable impervious barrier 30 can help to minimize such localized failure. Methods of construction that incorporate fibers (e.g., aramid, carbon, glass, basalt, and the like) into an elastomeric material may be beneficial under higher differential pressure conditions as fibers can add tensile strength to the movable impervious barrier 30 and counter the spring constant of the elastomer. Similarly, a thicker movable impervious barrier 30 can reduce deformation by increasing the spring constant of the barrier. The movable impervious barrier 30 can be configured having a thicker rim section and a thinner interior which can stiffen and strengthen the rim with additional material aiding in attachment to the vessel with fixtures 34.

Figure 1G:
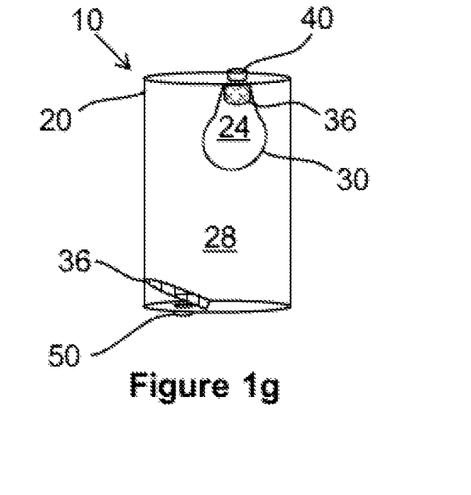
FIG. 1g is a schematic illustration of a refrigerant charge management device having a bladder under a high differential pressure condition.
Figure 1H:
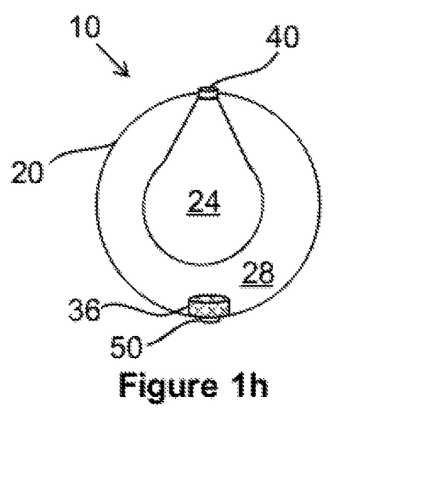
FIG. 1h is a schematic illustration of a refrigerant charge management device having a bladder and a spherical vessel construction.

The movable impervious barrier 30 can be configured as a bladder within the vessel 20 as illustrated in FIGS. 1d, 1g, and 1h. The movable impervious barrier 30 can be configured to deform from a high differential pressure state as shown in FIG. 1g to a low differential pressure state as shown in FIG. 1h. In the bladder configuration, the movable impervious barrier 30 can be secured to the vessel 20 at a port, (e.g., at first port 40, second port 50, or the like). For example, the movable impervious barrier 30 can be placed inside the vessel 20 and the opening end of the bladder brought through a threaded port where an adapter (e.g., configured for fluid connection to a heat pump system 100) can be attached (e.g., screwed, swaged, or the like) over the bladder end and onto the port to form the first port 40 as shown in FIG. 5.

The charge management device 10 can include a stop 38 for preventing the movable impervious barrier 30 from travelling past a specified position within the vessel 20. The stop 38 can include a protrusion from an interior wall of the vessel 20 configured to engage the movable impervious barrier 30 when traveling and prevent it from travelling further. The stop 38 can include the end of a guide 32, a perforated plate, a screen, or other fixed permeable barrier configured to allow movement of refrigerant fluid but prevent the movement of the movable impermeable barrier 30.

Optionally, the charge management device 30 can include additional ports interfacing the first volume 24 or the second volume 28. For example, a third port 60 can be disposed in fluid communication with the first volume 24. In an additional example, a fourth port 70 can be disposed in fluid communication with the second volume 28 (as in FIG. 1b). Said additional port can allow for a reduced pressure drop, in comparison to a single port (e.g., provided the ports are equal size), by providing more flow area into and out of the vessel 20.

Ports of the charge management device 30 can be positioned at the bottom of the vessel 20 to aid in draining liquid from the vessel when not operating. For example, as shown in FIG. 1c and FIG. 1d, the vessel can be constructed with an inner wall 29. The inner wall 29 can include openings 35 to allow fluid within the first volume 24 to flow between the inner section 33 and the annular section 37 (between the inner wall 29 and the wall of the vessel 20). Stops 38 can be positioned within the vessel to limit the travel of the movable impervious barrier 30 from blocking the openings 35.

Figure 2:
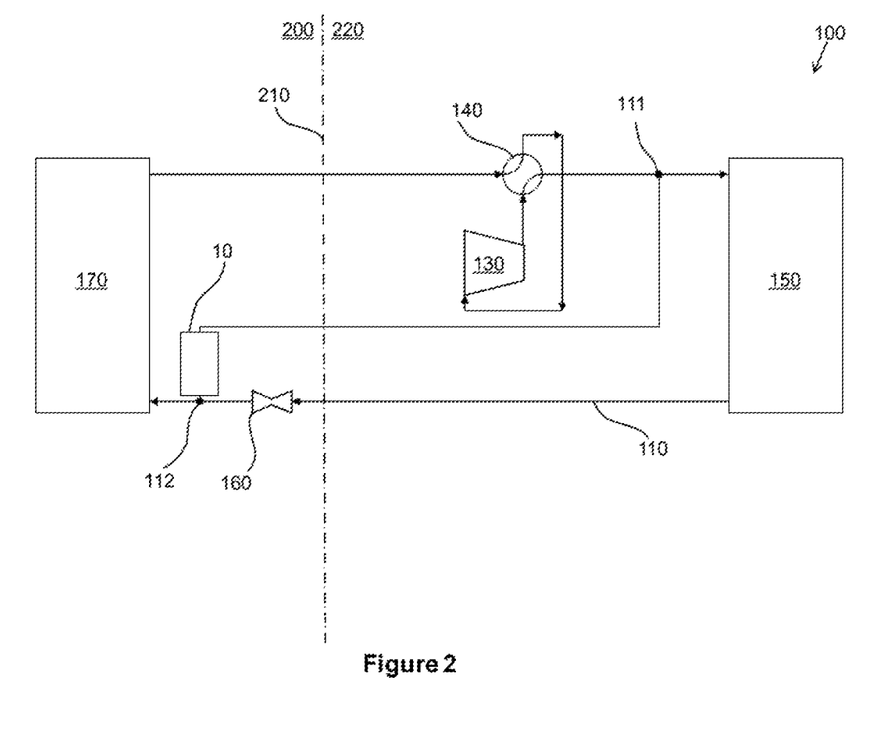
FIG. 2 is a schematic illustration of a heat pump system having a refrigerant charge management device operating in cooling mode.
Figure 3:
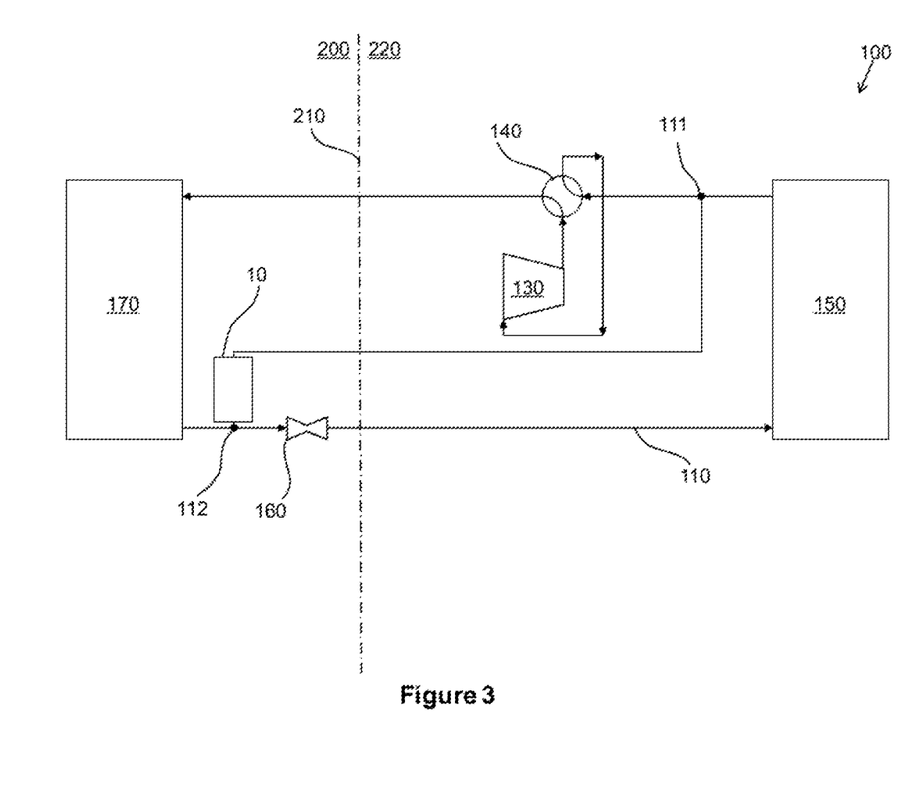
FIG. 3 is a schematic illustration of a heat pump system having a refrigerant charge management device operating in heating mode.

As illustrated in FIGS. 2-3, the charge management device 10 can be disposed in a closed refrigerant circuit 110 of a heat pump system 100. The heat pump system includes a compressor 130, an outdoor heat exchanger 150, an expansion device 160, an indoor heat exchanger 170, and a flow reversing valve 140. The flow reversing valve 140 is configured to reverse the direction of a refrigerant flow through at least a portion of the circuit 110 when the heat pump system 100 is switched from cooling mode operation to heating mode operation. For example, the flow through lines leading into and out of the compressor 130 is not reversed by the action of the reversing valve, but flow through the remainder of the circuit 110 is reversed. In this way, the refrigerant cycle can be operated in a cooling mode as shown in FIG. 2 or in a heating mode as shown in FIG. 3.

The refrigerant charge management device 30 can be disposed in fluid communication with a first location 111 of the refrigerant circuit, disposed between the compressor 130 and the outdoor heat exchanger 150, and a second location 112 of the circuit, disposed between the expansion valve 140 and the indoor heat exchanger 170. For example, the first port 40 can be disposed in fluid communication with the first location 111 and the second port 50 can be disposed in fluid communication with the second location 112. Alternatively, the orientation can be reversed where the first port 40 is disposed in fluid communication with the second location 112 and the second port 50 is disposed in fluid communication with the first location 111. Optionally, when the refrigerant charge management device 30 has more than two ports, two of the ports can form the first port 40 and the second port 50 while the other port(s) can be selectively disposed in fluid communication with the first volume 24 or second volume 28. For example, the first port 40 and the third port 60 can be disposed in fluid communication with the first volume 24 and the second port 50 can be disposed in fluid communication with the second volume 28 as in FIG. 1f. In an example where the refrigerant charge management device 30 has four ports, the first port 40 and the third port 60 can be disposed in fluid communication with the first volume 24 while the second port 50 and fourth port 70 can be disposed in fluid communication with the second volume 28 as in FIG. 1b.

When the first port 40 is attached in fluid communication at the first location 111 of a heat pump system 100 and the system is operating in cooling mode (as in FIG. 2) the movable impervious barrier 30 can travel toward the first position 11 as the system reaches steady state operating conditions. When R-410A refrigerant is used the pressure differential between the first location 111 and the second location 112 during cooling mode operation can be from about 100 pounds per square inch differential (psi(d)) to about 180 psi(d) and during heating mode operation can be from about −180 psi(d) to about −320 psi(d) (where the sign of the number corresponds to which location has a higher pressure, e.g., positive when the first location 111 has greater pressure than the second location 112). In another example, when R-134a refrigerant is used, the pressure differential between the first location 111 and the second location 112 during cooling mode operation can be from about 40 psi(d) to about 90 psi(d) and during heating mode operation can be from about −80 psi(d) to about −130 psi(d). As described above, the movable impervious barrier 30 can be configured such that the distance of travel corresponds to the magnitude of the pressure difference between the first volume 24 and the second volume 28.

A maximum travel of the movable impervious barrier 30, and corresponding minimum size of at least one of the first volume 24 or second volume 28, can be established by the location of the stop 38. For example, the stop 38 can be positioned to prevent the movable impervious barrier 30 from traveling past a position corresponding to about 99% to about 51% of the volume of the vessel 20, or about 95%, or about 90%, or about 85%, or about 80%, or about 75%, or about 70%, or about 65%, or about 60%, or about 55%, or about 51%. Accordingly, the stop 38 can be positioned to prevent a minimum volume of one of the first volume 24 or the second volume 28 from reaching about 1% to about 49% of the volume of the vessel 20, or about 5%, or about 10%, or about 15%, or about 20% or about 25%, or about 30%, or about 35%, or about 40%, or about 45%, or about 49%.

Optionally, the charge management device 10 can include an anti-blockage feature 36 disposed in the vessel to prevent the movable impermeable barrier 30 from blocking a port opening. Such an anti-blockage feature 36 can include a perforated plate, a screen, or other fixed permeable barrier configured to allow the movement of refrigerant fluid therethrough but prevent the movement of the movable impermeable barrier 30.

The first location 111 of a heat pump system 100 can include a vapor line set of the heat pump system 100, e.g. including a vapor line designed for conveying vapor phase refrigerant. The second location 112 of a heat pump system 100 can include a liquid line set of the heat pump system 100, e.g. including a liquid line designed for primarily conveying liquid phase refrigerant, although allowing for two-phase flow under certain operating conditions.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigerant charge management device comprising:
a refrigerant charge vessel enclosing a volume,
a movable impervious barrier separating the volume into a first volume and a second volume,
a first port disposed in fluid communication with the first volume and configured for fluid connection to a heat pump system,
a second port disposed in fluid communication with the second volume and configured for fluid connection to the heat pump system, wherein the movable impervious barrier is configured to move in response to a difference in pressure between the first volume and the second volume thereby changing the size of the first volume and the second volume; and
a stop disposed within the volume, wherein the stop is configured to prevent the movable impervious barrier from covering at least one of the first port or second port.

2. The refrigerant charge management device of claim 1, wherein the movable impervious barrier is configured to travel from a first position to a second position as the difference in pressure changes from +90 psi (g) to −130 psi (g).

3. The refrigerant charge management device of claim 1, wherein the movable impervious barrier is configured to travel from a first position to a second position as the difference in pressure changes from +180 psi (g) to −320 psi (g).

4. The refrigerant charge management device of claim 1, wherein the movable impervious barrier comprises a polymer material.

5. The refrigerant charge management device of claim 4, wherein the polymer comprises polyisoprene, nitrile butadiene rubber, acrylonitrile butadiene rubber, butyl rubber, neoprene, epichlorohydrin rubber, polytetrafluoroethylene, ethylene propylene rubber, ethylene propylene diene rubber, fluoroelastomer rubber, or a combination comprising at least one of the foregoing.

6. The refrigerant charge management device of claim 1, wherein the movable impervious barrier comprises a metal material.

7. The refrigerant charge management device of claim 1, wherein the movable impervious barrier comprises a piston, a compliant divider, or a bladder.

8. The refrigerant charge management device of claim 1, further comprising a third port in fluid communication with one of the first volume or second volume and configured for fluid connection to the refrigeration system and a fourth port in fluid communication with one of the first volume or second volume and configured for fluid connection to the refrigeration system, wherein only two ports are disposed in fluid communication with each of the first volume and second volume.

9. The refrigerant charge management device of claim 1, wherein one of the first volume or second volume is at least partially disposed in an annular passageway that surrounds the other of the first volume or second volume.

10. The refrigerant charge management device of claim 1, wherein the first port and second port are positioned at the bottom of the vessel such than liquid disposed therein can drain out of the vessel under the influence of gravity.

11. The refrigerant charge management device of claim 10, wherein the vessel comprises an annular divider surrounding the movable impervious barrier and at least partially separating the first volume from the second volume.

12. A heat pump system comprising:
a closed refrigerant circuit fluidly connecting a compressor, an outdoor heat exchanger, an expansion device, an indoor heat exchanger, and a flow reversing valve, wherein the flow reversing valve is configured to reverse the direction of a refrigerant flow through at least a portion of the circuit when the heat pump is switched from a cooling mode to a heating mode, and
a refrigerant charge management device of claim 1 wherein the first port is disposed in fluid communication with a first location of the closed refrigerant circuit disposed between the compressor and the outdoor heat exchanger, and
the second port is disposed in fluid communication with a second location of the closed refrigerant circuit disposed between the expansion valve and the indoor heat exchanger.

13. The heat pump system of claim 12, wherein the movable impervious barrier is configured to travel from a first position to a second position as the difference in pressure changes from +90 psi (g) to −130 psi (g).

14. The heat pump system of claim 12, wherein the movable impervious barrier is configured to travel from a first position to a second position as the difference in pressure changes from +180 psi (g) to −320 psi (g).

15. The heat pump system of claim 12, wherein the outdoor heat exchanger and the expansion device are disposed fluidly between the first port and second port of the closed refrigerant circuit.

16. The heat pump system of claim 12, wherein the first port of the refrigerant charge management device is fluidly connected to a vapor line of the heat pump system and the second port of the refrigerant charge management device is fluidly connected to a liquid line of the heat pump system.

17. A method of operating a heat pump system comprising:
connecting in fluid communication a first port of a refrigerant charge management device and a first location in a refrigerant circuit of the heat pump system, wherein the first location is disposed fluidly between a compressor and an outdoor heat exchanger,
connecting in fluid communication a second port of the refrigerant charge management device and a second location in the refrigerant circuit of the heat pump system, wherein the second location is disposed fluidly between an expansion valve and an indoor heat exchanger, operating the heat pump system comprising creating a refrigerant flow through the refrigerant circuit,
simultaneously displacing a first portion and a second portion of the refrigerant flow to the refrigerant charge management device, wherein the first portion is displaced from the first location to a first volume of the refrigerant charge management device and the second portion is displaced from the second location to a second volume of the refrigerant charge management device, and simultaneously adjusting the size of the first volume and the second volume of the refrigerant charge management device based on a difference in pressure between the first volume and second volume.

18. The method of operating a heat pump system of claim 17, further comprising: displacing a greater portion of the refrigerant flow from the first location than from the second location during a cooling mode operation of the heat pump system, and displacing a lesser portion of the refrigerant flow from the first location than from the second location during a heating mode operation of the heat pump system.

19. The method of operating a heat pump system of claim 17, further comprising stopping the simultaneous adjustment of the size of the first volume and second volume based on the difference in pressure between them by preventing movement of a movable impervious barrier disposed between the first volume and the second volume.

20. A method for refrigerant charge management, the method comprising:

enclosing a volume with a refrigerant charge vessel, separating, with a movable impervious barrier, the volume into a first volume and a second volume, providing a first port in fluid communication with the first volume, the first port configured for fluid connection to a heat pump system, and providing a second port in fluid communication with the second volume, the second port configured for fluid connection to the heat pump system, wherein the movable impervious barrier is configured to move in response to a difference in pressure between the first volume and the second volume thereby changing the size of the first volume and the second volume; and providing a stop within the volume, the stop configured to prevent the movable impervious barrier from covering at least one of the first port or second port.

* * * * *